(12) United States Patent
Sumser

(10) Patent No.: US 7,444,814 B2
(45) Date of Patent: Nov. 4, 2008

(54) INTERNAL COMBUSTION ENGINE HAVING A COMPRESSOR IN THE INDUCTION SYSTEM AND METHOD FOR THIS

(75) Inventor: Siegfried Sumser, Stüttgart (DE)

(73) Assignee: Daimler AG, Stuttgart (DE)

( * ) Notice: Subject to any disclaimer, the term of this patent is extended or adjusted under 35 U.S.C. 154(b) by 408 days.

(21) Appl. No.: 11/316,668

(22) Filed: Dec. 22, 2005

(65) Prior Publication Data

US 2006/0117749 A1   Jun. 8, 2006

Related U.S. Application Data

(63) Continuation-in-part of application No. PCT/EP2004/06834, filed on Jun. 24, 2004.

(30) Foreign Application Priority Data

Jun. 27, 2003   (DE)   ............................ 103 29 019

(51) Int. Cl.
*F02D 23/00* (2006.01)
*F02B 33/44* (2006.01)
*F02B 37/10* (2006.01)
*F02B 37/22* (2006.01)
*F01N 3/10* (2006.01)
*F01N 3/00* (2006.01)
*F02M 25/07* (2006.01)

(52) U.S. Cl. .................... 60/601; 60/602; 60/605.1; 60/611; 60/605.2; 60/285; 60/289; 60/290

(58) Field of Classification Search ........... 60/600–603, 60/605.1, 611–612, 285, 289, 290; 415/158–159, 415/167

See application file for complete search history.

(56) References Cited

U.S. PATENT DOCUMENTS

| 4,719,758 | A  | * | 1/1988  | Sumser ..................... 60/611 |
| 6,378,307 | B1 | * | 4/2002  | Fledersbacher et al. ....... 60/611 |
| 6,634,174 | B2 | * | 10/2003 | Sumser et al. ................ 60/611 |
| 6,669,441 | B2 | * | 12/2003 | Bertnik et al. .............. 415/158 |
| 6,681,564 | B2 | * | 1/2004  | Nishiyama et al. ............ 60/285 |
| 6,817,174 | B1 | * | 11/2004 | Igarashi et al. ............... 60/285 |
| 6,901,746 | B2 | * | 6/2005  | Nishiyama et al. ............ 60/285 |

(Continued)

FOREIGN PATENT DOCUMENTS

DE          100 49 198 A    4/2002

(Continued)

*Primary Examiner*—Thai-Ba Trieu
(74) *Attorney, Agent, or Firm*—Klaus J. Bach

(57) ABSTRACT

In an internal combustion engine having a compressor in its induction system which has a compressor wheel rotatably mounted in an intake duct combustion air compressor, whereby the combustion air is compressed to an increased boost pressure, and an auxiliary duct which opens into the compressor intake duct, an adjustable blocking element being arranged in the compressor intake duct upstream of the compressor wheel and an adjustable swirl device being arranged in an opening region of the auxiliary duct, and an $NO_x$ storage catalytic converter being disposed in the exhaust gas system, the blocking device and the swirl device are adjustable so as to generate an air fuel ratio with an excess of fuel, and, at the same time a propulsive swirl is applied to the compressor wheel when the blocking element is moved to a position in which air supply to the compressor intake duct is restricted.

14 Claims, 2 Drawing Sheets

U.S. PATENT DOCUMENTS

| | | | | |
|---|---|---|---|---|
| 6,904,752 | B2 * | 6/2005 | Foster et al. | 60/285 |
| 6,931,837 | B2 * | 8/2005 | Verkiel et al. | 60/602 |
| 6,957,535 | B2 * | 10/2005 | Sumser et al. | 60/612 |
| 7,010,914 | B1 * | 3/2006 | Roberts et al. | 60/600 |
| 7,127,893 | B2 * | 10/2006 | Schmid et al. | 60/605.2 |
| 7,246,490 | B2 * | 7/2007 | Sumser et al. | 60/605.2 |
| 2007/0137199 | A1 * | 6/2007 | Magner et al. | 60/602 |

FOREIGN PATENT DOCUMENTS

| | | |
|---|---|---|
| DE | 102004036506 A1 * | 4/2006 |
| DE | 199 55 508 C | 4/2008 |
| WO | WO 03/048533 A | 6/2003 |

* cited by examiner

INTERNAL COMBUSTION ENGINE HAVING A COMPRESSOR IN THE INDUCTION SYSTEM AND METHOD FOR THIS

This is a Continuation-In-Part Application of International application PCT/EP2004/006834 filed Jun. 24, 2004 and claiming the priority of German application 103 29 019.2 filed Jun. 27, 2003.

BACKGROUND OF THE INVENTION

The invention relates to an internal combustion engine having a compressor in the induction system with swirl vanes disposed in the inlet passage to the turbine and to a method for operating an internal combustion engine.

DE 199 55 508 C1 discloses a turbocharged internal combustion engine having an exhaust gas turbocharger which comprises an exhaust gas turbine disposed in the exhaust gas system and a compressor disposed in the induction system of the internal combustion engine. The turbine wheel of the exhaust gas turbine is driven by pressurized exhaust gases and the turbine wheel rotation is transmitted by means of a shaft to the compressor wheel which compresses combustion air supplied to the compressor from the ambient air to an increased boost pressure. The compressor wheel is rotatably mounted in a compressor intake duct, by means of which the combustion air is supplied to the inlet end of the compressor. In the compressor, an auxiliary duct is formed parallel to the compressor intake duct, which auxiliary duct opens radially into the compressor intake duct adjacent the compressor wheel. By way of the auxiliary duct additional combustion air may be supplied radially to the compressor wheel blades under certain operating conditions. An adjustable swirl vane structure is arranged in the region in which the auxiliary duct opens into the compressor intake duct, which swirl vane structure provides a propulsive swirl of additional air to the compressor wheel. The air quantity to be supplied may be set by means of a throttle valve in the. axial compressor intake duct.

With the aid of this device, a so-called cold air turbine operation of the compressor may be implemented in which a vacuum prevails in the induction system downstream of the compressor at low loads and speeds of the internal combustion engine, which vacuum causes a pressure drop across the compressor wheel that can be utilized to drive the compressor wheel. In this operating situation, the combustion air is supplied by means of the auxiliary duct which opens radially, into the compressor and causes a swirl providing for an improved drive action on the compressor wheel.

Based on this prior art, it is the object of the invention to provide an internal combustion engine with a compressor in the combustion air intake system so as to reduce the emissions of the internal combustion engine using simple measures.

SUMMARY OF THE INVENTION

In an internal combustion engine having a compressor in its induction system which has a compressor wheel rotatably mounted in an intake duct combustion air compressor, whereby the combustion air is compressed to an increased boost pressure, and an auxiliary duct which opens into the compressor intake duct, an adjustable blocking element being arranged in the compressor intake duct upstream of the compressor wheel and an adjustable swirl device being arranged in an opening region of the auxiliary duct, and an $NO_x$ storage catalytic converter being disposed in the exhaust gas system, the blocking device and the swirl device are adjustable so as to generate an air fuel ratio with an excess of fuel, and, at the same time a propulsive swirl is applied to the compressor wheel when the blocking element is moved to a position in which air supply to the compressor intake duct is restricted.

In order to reduce the nitrogen oxides, a richer air fuel mixture having a relative surplus of fuel ($\lambda<1$) is generated at regular intervals which cause a reduction of the nitrogen oxides in the $NO_x$ storage catalytic converter. The air fuel ratio having a relative surplus of fuel is preferably obtained by reducing the air supply to the air side of the internal combustion engine whilst the fuel supply is kept at least approximately constant. In order to reduce the supply of combustion air, the blocking element in the compressor is set to a position which restricts the air supply. The swirl device in the auxiliary duct which opens into the compressor intake duct is simultaneously set to a position in which the combustion air to be supplied by means of the auxiliary duct acts upon the compressor wheel with a propulsive swirl. The compressor wheel is thus driven in this operating phase in a cold air turbine operation mode of the compressor. A drop in the compressor speed can in this way be prevented in spite of the air flow-restricting position of the blocking element.

The internal combustion engine according to the invention is equipped in particular with an exhaust gas turbocharger which comprises an exhaust gas turbine in the exhaust gas system. The exhaust gas turbine is driven by the pressurized exhaust gases, the rotation of the turbine wheel being transmitted by means of a shaft to the compressor wheel. A reduction of the air supply for enriching the air fuel mixture in order to reduce nitrogen oxides in the storage catalytic converter also results in lower exhaust gas emission with a correspondingly lowered exhaust gas back pressure, as a result of which, in principle, the turbo speed drops. This drop may be at least partially compensated for by means of the action of swirl on the compressor wheel such that there is no drop or only an insignificant drop in turbo speed. Full turbo performance is thus instantly available in the event of subsequent acceleration.

The use of variable turbine geometry, by means of which the effective turbine inlet cross section can be variably set, in the exhaust gas turbine may assist in maintaining the turbo speed in the event of a reduced air supply. In the event of a reduced air supply, the variable turbine geometry may be set to a choking position which reduces the cross section, as a result of which the exhaust gas back pressure is increased.

The swirl device in the auxiliary duct may be functionally connected to the blocking or throttle element in the compressor intake duct. This is achieved for example by adjusting the blocking element, such that the flow cross section in the compressor intake duct is controlled and at the same time, also the swirl device is adjusted and the cross section of the opening of the auxiliary duct into the compressor intake duct is also varied. On account of the functional coupling of a blocking element and a swirl device, it is sufficient to provide just one common actuating element for adjusting both components.

The invention will become more readily apparent from the following description of preferred embodiments on the basis of the accompanying drawings:

DESCRIPTION OF A PARTICULAR EMBODIMENT

In the figures, identical components are provided with identical reference symbols.

Figure 1:
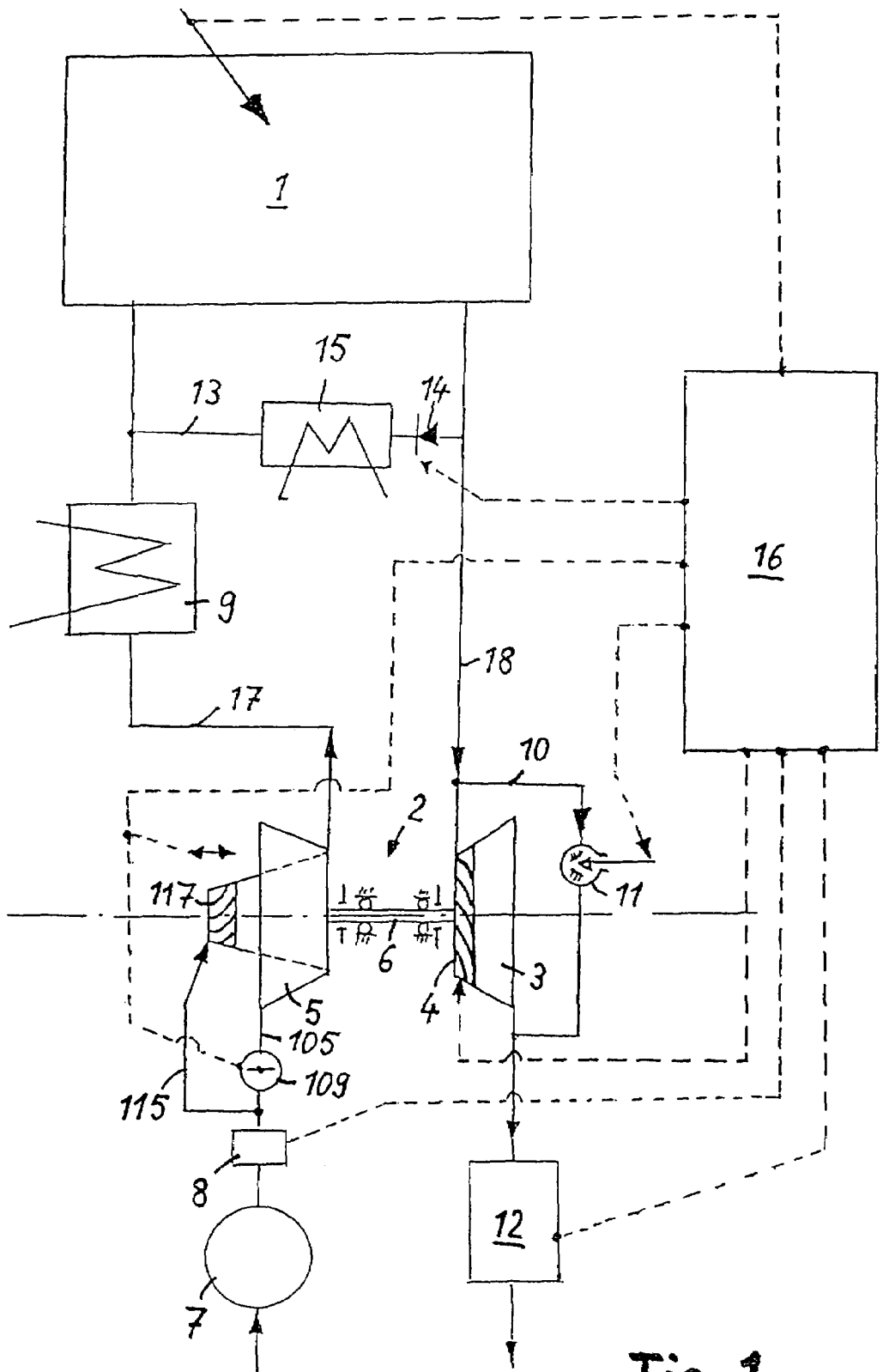
FIG. 1 shows schematically an internal combustion engine having an exhaust gas turbocharger and a $NO_x$ storage catalytic converter downstream of the exhaust gas turbine.

The internal combustion engine 1—a diesel engine or a gasoline engine—illustrated in FIG. 1 is assigned an exhaust gas turbocharger 2 having an exhaust gas turbine 3 in the exhaust gas system 18 and a compressor 5 in the induction system 17. The turbine wheel of the exhaust gas turbine 3 is driven by the exhaust gases of the internal combustion engine 1 which are under exhaust gas back pressure. The rotation of the turbine wheel is transmitted by means of a shaft 6 to the compressor wheel, which compresses induction air for combustion to an increased boost pressure. The combustion air is supplied by means of the induction system 17 to the cylinders of the internal combustion engine. The exhaust gas turbine 3 may be equipped with a variable inlet guide vane structure 4 in order to variably set the effective turbine inlet cross section.

The compressor 5 includes in the compressor housing a compressor intake duct 105 and a blocking element 109, by means of which the air quantity admitted to the compressor can be controlled. Furthermore, the compressor 5 is equipped with an auxiliary duct 115 which extends approximately parallel to the compressor intake duct 105 and opens, by means of a swirl grate 117 into the compressor intake duct 105 at the level of the compressor wheel. The swirl grate 117 is adjustable in such a way that the geometry and/or the cross-sectional area of the opening between the auxiliary duct 115 and the compressor intake duct 105 can be adjusted.

An air filter 7 and an air flow measuring gauge 8 are arranged in the induction system 17 upstream of the compressor 5. Downstream of the compressor 5, the combustion air compressed to a higher pressure is first cooled in a charge air cooler 9 and then fed under boost pressure to the cylinders of the internal combustion engine 1.

The exhaust gas turbine 3 is provided with a bypass line 10 which bypasses the exhaust gas turbine 3 and an adjustable bypass valve 11 arranged in the bypass line 10.

A $NO_x$ storage catalytic converter 12 is arranged in the exhaust gas system 18 downstream of the exhaust gas turbine 3, in which catalytic converter nitrogen oxides are stored and reduced at regular intervals by means of enrichment of the air fuel mixture. In addition, further pollutants, particularly particulates, may also be filtered out or reduced in the $NO_x$ storage catalytic converter 12.

The internal combustion engine 1 includes an exhaust gas recirculation device which comprises a recirculation line 13 which branches off from the exhaust gas system 18 upstream of the exhaust gas turbine 3 and opens out into the induction system 17 downstream of the charge air cooler 9. An adjustable recirculation valve 14 and, downstream of the recirculation valve, an exhaust gas cooler 15 are disposed in the recirculation line.

The adjustable actuating elements of the internal combustion engine or of the assigned units can be set by means of a control unit 16. In particular, the fuel injection into the cylinders of the internal combustion engine 1 may be set by means of control signals from the control unit 16, as may the variable turbine inlet guide vane structure 4, the bypass valve 11, the blocking element 109 of the compressor 5 and the swirl grate 117 and the return valve 14 of the exhaust gas recirculation device.

Figure 2:
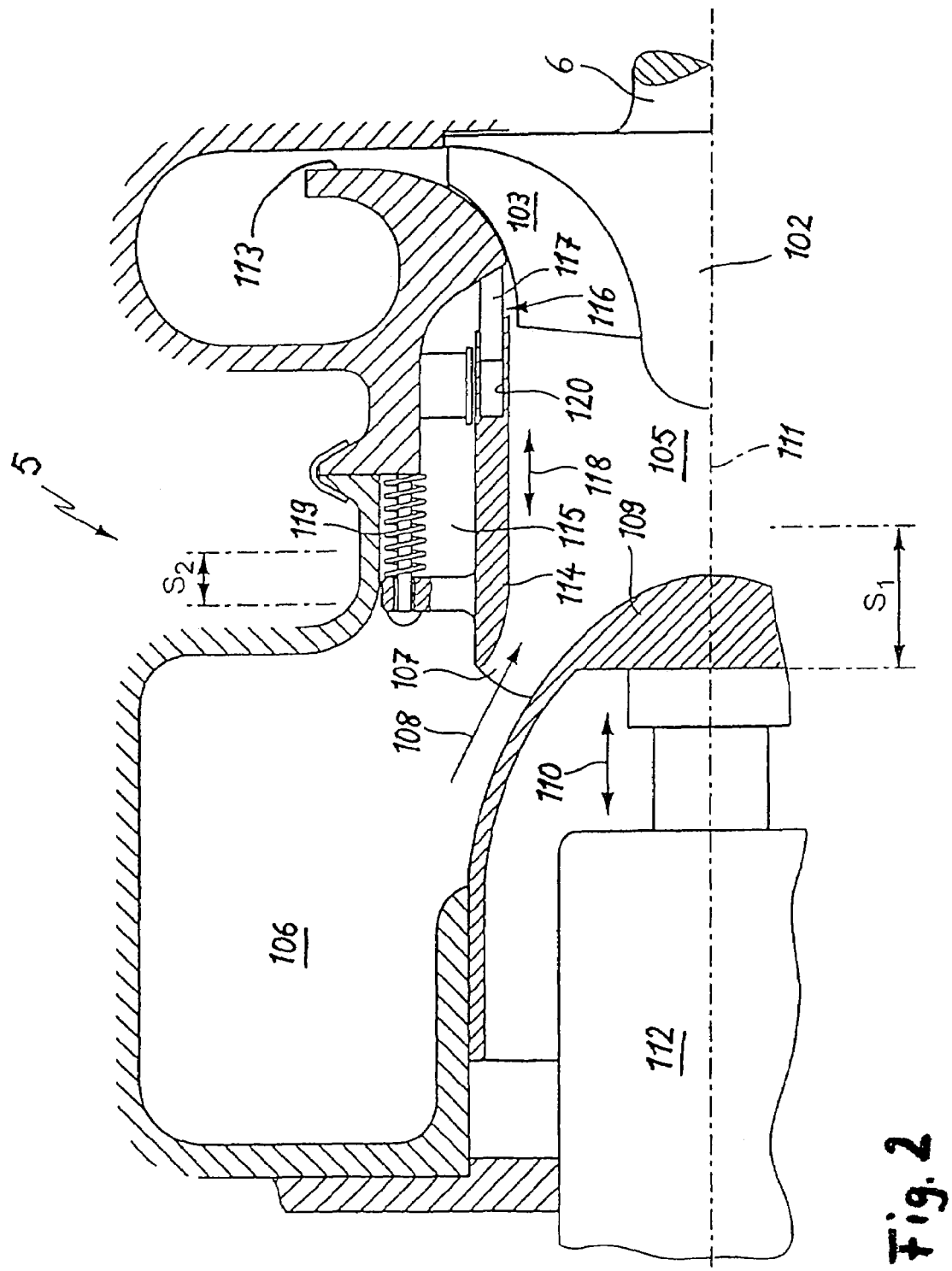
FIG. 2 is a sectional view of a compressor having a compressor wheel to which combustion air can be supplied by means of an axial compressor intake duct and a parallel auxiliary duct which opens into the compressor intake duct, illustrated with a blocking element in the compressor intake duct in an open position and a swirl device, also in an open position.

The compressor 5 illustrated in FIG. 2 comprises a compressor wheel 102 arranged in the compressor housing, which compressor wheel is rotatably mounted in the compressor intake duct 105 and is driven by the assigned exhaust gas turbine via the shaft 6. The combustion air which travels from an upstream air collection space 106 arranged in the compressor housing via an inlet opening 107 into the axial compressor intake duct 105 is compressed to an increased boost pressure by the rotating compressor wheel blades 103 and is discharged radially into a diffuser 113 in the compressor housing. The compressed combustion air is then cooled in the charge air cooler and fed under boost pressure into the cylinders of the internal combustion engine. The rotational axis of the compressor wheel 102 coincides with the compressor axis 111 and the longitudinal axis of the compressor intake duct 105. The upstream air collection space 106 is designed as an annular space with a radial clearance to the compressor axis 111. The inlet opening 107, which is part of the compressor intake duct 105 and by means of which the combustion air flows from the air collection space 106 in the direction of the arrow 108 into the compressor intake duct 105, extends at an angle with the compressor axis 111.

A blocking element 109 is arranged in the compressor intake duct 105 in an axially displaceable manner in the direction of the arrow 110. Axial movement of the blocking element adjusts the cross section of the inlet opening 107 between the open position shown in FIG. 2 and a closed position, in which the inlet opening 107 is completely blocked and a transfer of combustion air from the air collection space 106 into the compressor intake duct 105 is prevented. The blocking element 109 is movably by an axial adjustment distance $s_1$ from the open position to the closed position. The blocking element 109 is displaced axially with the aid of an actuating element 112.

In an open position, the inlet opening 107 is formed between the outer contour of the blocking element 109 and an axial slide sleeve 114 which may be displaced in the axial direction. The slide sleeve 114 separates an auxiliary axially extending annular duct 115 from the compressor intake duct. The auxiliary duct 115 also communicates at one end with the air collection space 106 and opens out radially at the other end by means of an opening region 116 into the compressor intake duct 105 at the compressor wheel 102. The combustion air supplied by means of the auxiliary duct 115 impinges approximately radially on the compressor wheel blades 103 and acts upon the latter with an accelerative swirl. In order to improve the swirl effect, a swirl grate 117 is arranged in the opening region 116. The swirl grate for example has guide vanes distributed about the circumference of the swirl grate, which guide vanes influence the flow distribution of the impinging combustion air.

The axial slide sleeve 114 and the swirl grate 117 together form a swirl device, by means of which the opening cross section of the opening region 116 is adjusted between the open position illustrated in FIG. 2 and a choked position, in which the opening cross section is reduced to a minimum and if appropriate completely blocked. The opening cross section is adjusted by means of an axial displacement of the axial slide sleeve 114 in the direction of the arrow 118. The maximum possible adjustment distance of the axial slide sleeve 114 when moving between its open position and its choked position is designated by $S_2$ in FIG. 2.

The axial slide sleeve 114 is displaceably mounted on the compressor housing and is biased into its open position by a spring element 119. To move from the open position illustrated in FIG. 2 to the choked position, the axial slide sleeve 114 is displaced counter to the spring force of the spring element 119; in this case, the swirl grate 117 is pushed into an axial receiving opening 120 in the axial slide sleeve 114 or, rather, the slide sleeve 114 is moved over the swirl grate 117.

The inlet opening 107 of the compressor intake duct 105 is blocked when the blocking element 109 is axially displaced into its closed position. The blocking element 109 is a blocking plunger, having an outer contour engaging the axial slide sleeve 114 in the blocked position such that the inlet opening 7 is closed. When the blocking element 109 approaches the axial slide sleeve 114, the latter is initially still in its open position and is not yet pushed toward its choking position. In this configuration, the compressor 5 assumes the function of a cold air turbine since the combustion air stream being supplied by means of the auxiliary duct 115 drives the compressor wheel 102 on account of a pressure drop between the upstream and downstream sides of the compressor and is expanded to a sub-atmospheric pressure downstream of the compressor wheel 102.

In the choking position of the axial slide sleeve 114, the blocking element 109 is axially pushed so far toward the compressor wheel 102 that the axial slide sleeve 114 which is acted upon by the blocking element 109 is displaced against the force of the spring element 119 into its choking position, in which the cross section of the opening region 116 is reduced to a minimum or, if appropriate, is completely blocked. In the choking position, the swirl grate 117 is almost completely contained within the axial receiving opening 120 in the axial slide sleeve 114. Only a relatively small air mass flow can flow through the remaining gap in the opening region 116, so that the compressor wheel 102 also experiences only a correspondingly small angular momentum. At the same time, the inlet opening 107 to the compressor intake duct 105 is blocked.

When the blocking element 109 is moved in the opposite direction—away from the compressor wheel 102—the axial slide sleeve 114 is initially pushed under the influence of the spring element 119 from the choked position into its open position, the inlet opening 107 to the compressor intake duct 105 remains closed in the first phase. In the further process, also the inlet opening 107 is opened again after the open position of the axial slide sleeve 114 is reached, which can be ensured by means of a stop, by further movement of the blocking element 109 away from the compressor wheel 102.

In order to break down the nitrogen oxides which are stored in the $NO_x$ storage catalytic converter, the internal combustion engine is supplied at regular intervals with an enriched air fuel mixture which has an air fuel ratio of $\lambda<1$. This is preferably achieved by means of a reduction in the air supply to the air side of the internal combustion engine whilst the fuel injection is kept at least approximately constant. The blocking element 109 is moved to a closed position so that the inlet opening 107 is closed and no combustion air can pass through the compressor by way of the compressor intake duct 105. In order to prevent a drop in exhaust gas turbocharger speed, the axial slide sleeve 114 remains in its open position so that the opening region 116 in which the swirl grate 117 is arranged remains open and combustion air can be fed to the compressor wheel 102 by way of the auxiliary duct 115. The supplied combustion air acts on the compressor wheel with a propulsive swirl, as a result of which the turbo speed can: be at least approximately maintained.

What is claimed is:

1. A method for operating an internal combustion engine having an air induction and an exhaust gas system, a compressor with a compressor housing and a compressor wheel (102) rotatably mounted in the compressor housing disposed in the induction system for compressing combustion air to an increased boost pressure, the compressor housing having an intake duct and an auxiliary duct (115) extending to the compressor intake duct (105) and being in communication therewith via an opening region (116) formed adjacent the compressor wheel (102), an adjustable blocking element (109) arranged in the compressor intake duct (105) upstream of the compressor wheel (102), an adjustable swirl device (114, 117) arranged in the opening region (116) of the auxiliary duct (115) into the compressor intake duct (105), and an $NO_x$ storage catalytic converter (12) arranged in the exhaust gas system, the swirl device (114, 117) being movable to a position in which combustion air is directed onto the compressor wheel so as to produce a propulsive swirl, and simultaneously the blocking element (109) being movable to a position in which the air supply to the compressor intake duct (105) is restricted in order to generate an air fuel ratio ($\lambda$) having a relative surplus of fuel, said method comprising the steps of restricting the air supply to the compressor wheel (102), and applying to the compressor wheel (102) simultaneously a propulsive swirl of combustion air while keeping the fuel supply at least approximately constant in order to reduce $NO_x$ emissions.

2. An internal combustion engine having an air induction and an exhaust gas system, a compressor with a compressor housing and a compressor wheel (102) rotatably mounted in the compressor housing disposed in the induction system for compressing combustion air to an increased boost pressure, the compressor housing having an intake duct and an auxiliary duct (115) extending to the compressor intake duct (105) and being in communication therewith via an opening region (116) formed adjacent the compressor wheel (102), an adjustable blocking element (109) arranged in the compressor intake duct (105) upstream of the compressor wheel (102), an adjustable swirl device (114, 117) arranged in the opening region (116) of the auxiliary duct (115) into the compressor intake duct (105), and an $NO_x$ storage catalytic converter (12) arranged in the exhaust gas system, the swirl device (114, 117) being movable to a position in which combustion air is directed onto the compressor wheel so as to produce a propulsive swirl, and simultaneously the blocking element (109) being movable to a position in which the air supply to the compressor intake duct (105) is restricted in order to generate an air fuel ratio ($\lambda$) having a relative surplus of fuel.

3. The internal combustion engine as claimed in claim 2, wherein the compressor (5) is part of an exhaust gas turbocharger (2) having an exhaust gas turbine (3) in the exhaust gas system (18), the compressor wheel (102) being coupled to the turbine wheel.

4. The internal combustion engine as claimed in claim 3, wherein the exhaust gas turbine (3) has a variable guide vane structure (4) in order to variably set the effective turbine inlet cross section.

5. The internal combustion engine as claimed in claim 3, wherein the $NO_x$ storage catalytic converter (12) is arranged downstream of the exhaust gas turbine (3).

6. The internal combustion engine as claimed in 2, wherein a slide sleeve (114) is axially movably supported in the intake duct (105) in spaced relationship form the intake duct wall so as to form the auxiliary duct therebetween and the blocking element (109) in the compressor (5) is movable so as to engage and move the slide sleeve (114) relative to the swirl device (117).

7. The internal combustion engine as claimed in claim 6, wherein the slide sleeve (114) is spring-loaded into one of its end positions and the blocking element (109) acts on the slide sleeve (114) counter to the spring direction.

8. The internal combustion engine as claimed in claim 6, wherein, in a first movement segment of the adjusting movement, only the blocking element (109) is displaced, and in a subsequent second movement segment, the slide sleeve (114, 117) is displaced by the blocking element (109).

9. The internal combustion engine as claimed in claim 6, wherein the adjusting movement of the blocking element (109) is an axial movement in the direction of the axis of the compressor wheel (102).

10. The internal combustion engine as claimed in claim 6, wherein the swirl device (117) comprises the axial slide sleeve (114) and a swirl grate (117) disposed in the area of the opening (116) of the auxiliary duct (115), the axial slide sleeve (114) being movable between an open position which unblocks the swirl grate (117) and a choking position which reduces the flow cross section through the swirl grate (117).

11. The internal combustion engine as claimed in claim 10, wherein the axial slide sleeve (114) includes an axial receiving opening (120) for receiving the swirl grate (117) in a choking position.

12. The internal combustion engine as claimed in claim 10, wherein the axial slide sleeve (114) is biased into its open position by a spring element (119).

13. The internal combustion engine as claimed in claim 10, wherein the axial slide sleeve (114) forms a stop for the blocking element (109), the blocking element (109) coming into contact with the axial slide sleeve (114) to close the inlet opening (107) to the compressor intake duct (105).

14. The internal combustion engine as claimed in claim 6, wherein the blocking element (109) comprises an axially displaceable blocking plunger in the compressor intake duct, the cross-section of an inlet opening (107) of the compressor intake duct (105) being variably adjustable between an open and a closed position by the blocking plunger (104).

* * * * *